(12) United States Patent
Kisu et al.

(10) Patent No.: US 11,377,049 B2
(45) Date of Patent: Jul. 5, 2022

(54) WIRING STRUCTURE OF WIRE HARNESS AND WIRE HARNESS

(71) Applicant: Yazaki Corporation, Tokyo (JP)

(72) Inventors: Naomi Kisu, Susono (JP); Hisashi Takemoto, Susono (JP); Atsuyoshi Yamaguchi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/222,063

(22) Filed: Apr. 5, 2021

(65) Prior Publication Data

US 2021/0309169 A1  Oct. 7, 2021

(30) Foreign Application Priority Data

Apr. 7, 2020  (JP) .............................. JP2020-069250

(51) Int. Cl.
*B60R 16/02* (2006.01)
*H02G 3/30* (2006.01)
*H01B 7/00* (2006.01)

(52) U.S. Cl.
CPC ......... *B60R 16/0215* (2013.01); *H02G 3/305* (2013.01); *H01B 7/0045* (2013.01)

(58) Field of Classification Search
CPC ... B60R 16/0215; H02G 3/305; H01B 7/0045
USPC ...................................................... 174/72 A
See application file for complete search history.

(56) References Cited

U.S. PATENT DOCUMENTS

| | | | |
|---|---|---|---|
| 2007/0107831 | A1* | 5/2007 | Von Samson-Himmelstjerna ....... B60R 16/0215 156/290 |
| 2015/0014052 | A1* | 1/2015 | Matsuda .............. H02G 3/0481 174/72 A |
| 2017/0327060 | A1 | 11/2017 | Nakajima |
| 2018/0015689 | A1* | 1/2018 | Takata ................. B60R 16/0215 |
| 2019/0287700 | A1* | 9/2019 | Hamada ............... H01B 7/0045 |

FOREIGN PATENT DOCUMENTS

| | | |
|---|---|---|
| EP | 3 626 541 A1 | 3/2020 |
| JP | 5-207628 A | 8/1993 |
| JP | 2000-264137 A | 9/2000 |
| JP | 2004-306741 A | 11/2004 |
| JP | 2004-320956 A | 11/2004 |
| JP | 2006-206820 A | 8/2006 |

(Continued)

*Primary Examiner* — Timothy J Thompson
*Assistant Examiner* — Michael F McAllister
(74) *Attorney, Agent, or Firm* — Sughrue Mion, PLLC

(57) ABSTRACT

A wiring structure of a wire harness in which a wire harness is fixed to an adhesive member laid on a surface of a roof lining of an automobile is disclosed, wherein on at least a part of a bent portion, the plurality of electric wires are sandwiched between two belt-shaped tapes in which both side edges are fixed to each other, are spread side by side in the width direction, and are attached to an adhesive surface provided on an inner surface of at least one of the two tapes, thereby providing a restraint portion in which the bundle of the electric wires is held in a flat shape, a portion excluding the restraint portion is a non-restraint portion in which the electric wires are unrestrained, and an outer surface of one of the two tapes in the restraint portion is attached to the adhesive member.

4 Claims, 4 Drawing Sheets

(56) References Cited

FOREIGN PATENT DOCUMENTS

| | | |
|---|---|---|
| JP | 2014-136536 A | 7/2014 |
| JP | 2015-50855 A | 3/2015 |
| JP | 2015-74365 A | 4/2015 |
| JP | 2016-139551 A | 8/2016 |

* cited by examiner

WIRING STRUCTURE OF WIRE HARNESS AND WIRE HARNESS

CROSS REFERENCE TO RELATED APPLICATIONS

This application is based on and claims priority from Japanese patent application No. 2020-069250 filed on Apr. 7, 2020, the entire contents of which are incorporated herein by reference.

TECHNICAL FIELD

The present invention relates to a wiring structure of a wire harness in an automobile roof portion and a wire harness for an automobile roof portion.

BACKGROUND ART

A roof portion of an automobile is provided with a roof panel constituting an upper surface of a roof portion and a roof lining mounted on the roof panel and constituting a lower surface of the roof portion. A wire harness is wired in a space between the roof panel and the roof lining, and electric power is supplied to a room lamp or the like via the wire harness.

Incidentally, for example, as in Patent Literatures 1 and 2, a wire harness wired in a roof portion of an automobile is fixed in a desired wiring path by being pressed and adhered and fixed to an adhesive member laid along a wiring path in advance on the surface of a roof lining. However, since the wire harness for the automobile roof portion has a circular cross section or may not have an uniform cross section, the wire harness cannot be adhered and fixed in a wide adhesion area, and it is difficult to securely fix the wire harness. Further, in Patent Literatures 3 to 4, since the wire harness is fixed to the target member using a fixing member such as a locking member, workability is significantly reduced. Further, in the configurations of Patent Literatures 5 to 6, since the type of covering the entire wire harness is predetermined in advance, there is no versatility. In addition, in the configurations of Patent Literatures 7 to 8, since the cross section of the wire harness remains circular, it is not a solution for adhering and fixing the adhesion of the wire harness.

In addition, the wire harness for the automobile roof portion can be made thin as a whole, and there are many branch line portions, so it is difficult to find a reference point when assembling to the roof lining. Generally, in a case where a wire harness is wired on a roof lining, portions responsible for the direction of a wiring path, such as a bend portion or a branch portion of the wire harness, are important for accurately wiring the entire wire harness. Therefore, when the wire harness is fixed using an adhesive tape, the wire harness is wired while being fixed with an adhesive tape such that these portions serve as base positions.

However, in this method, when the wiring path is complicated, the number of fixing points will increase and the work will be troublesome, and when the wire harness is hard, it is difficult to make the wire harness follow the roof lining itself, it is very time-consuming since it is necessary to habituate the electric wires such that the bending direction and branching direction are correct and proceed with the wiring work. In addition, for example, the branch portion is a place where the electric wires are gathered, and the tape winding is often performed more than necessary in order to correct the directionality of the branch line portions. As a result, the portions are thicker or harder, making it difficult to attach the portions in a flat state in order to increase the adhesive area, which is likely to cause a problem in wiring performance.

Therefore, Patent Literature 9 describes a wiring structure of a wire harness of an automobile roof portion capable of increasing the fixing strength. In this wiring structure, the plurality of electric wires constituting the wire harness are in an unbound state, and the electric wires in the unbound state are surrounded by a tubular body formed of a flexible sheet with a gap therebetween, and the tubular body is fixed to the adhesive member on the surface of the roof lining in a flat cross-sectional shape.

That is, in this wiring structure, the plurality of electric wires can be moved by using the gap in the tubular body, and when the wire harness is fixed on the adhesive member of the roof lining, the tubular body is smashed from above and below and fixed to the adhesive member while being deformed into a flat cross-sectional shape. As a result, the wire harness can be firmly and stably fixed on the adhesive member of the roof lining while securing a large adhesion area of the tubular body without requiring any separate component or a complicated work process.

CITATION LIST

Patent Literature

Patent Literature 1: JP-A-2000-264137
Patent Literature 2: JP-A-2004-320956
Patent Literature 3: JP-A-2015-50855
Patent Literature 4: JP-A-2016-139551
Patent Literature 5: JP-A-2015-74365
Patent Literature 6: JP-A-5-207628
Patent Literature 7: JP-A-2006-206820
Patent Literature 8: JP-A-2004-306741
Patent Literature 9: JP-A-2014-136536

SUMMARY OF INVENTION

Incidentally, in the technique described in Patent Literature 9, since the electric wires in the flexible sheet are not fixed and can move freely, particularly in the bend portion or the branch portion, the electric wires are less likely to spread side by side in the flat shape in the flexible sheet. As a result, there is a concern that a sufficient adhesion area cannot be secured and the fixing force is reduced. In addition, in a state after the wire harness is wired and fixed to the roof lining, the electric wires may move in the flexible sheet, and may be affected by the vehicle vibration.

According to an embodiment of a wiring structure of a wire harness in an automobile roof portion and a wire harness, a flat form can be reliably maintained by restraining useless movement of the electric wires, and a strong fixing strength to the roof lining can be stably exhibited.

According to an embodiment of a wiring structure of a wire harness of an automobile roof portion in which a wire harness is wired by being fixed to an adhesive member laid on a surface of a roof lining of an automobile, on at least a part of a bent portion which is wired by bending a plurality of electric wires of the wiring path of the wire harness, the plurality of electric wires are sandwiched between two belt-shaped tapes in which both side edges in the width direction are fixed to each other, are arranged side by side in the width direction of the tapes, and are attached to an adhesive surface provided on an inner surface of at least one of the two tapes, thereby providing a restraint portion in which the bundle of the electric wires is held in a flat shape, a portion excluding the restraint portion is a non-restraint portion in which the plurality of electric wires are unrestrained, and an outer surface of one of the two tapes in the restraint portion is attached to the adhesive member, whereby the wire harness is fixed to the surface of the roof lining.

DESCRIPTION OF EMBODIMENTS

Specific embodiments according to the present invention will be described below with reference to the accompanying drawings.

Figure 1:
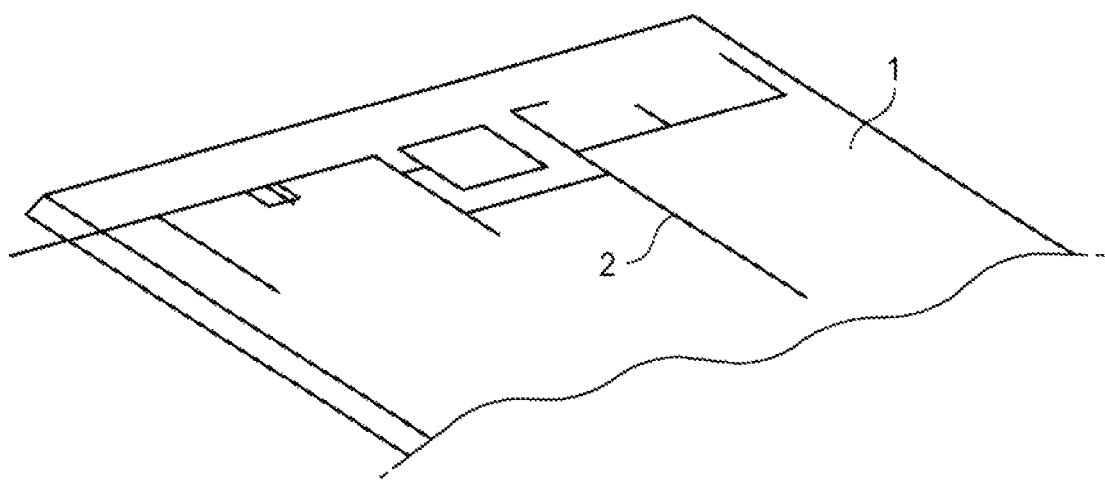
FIG. 1 is a perspective view showing a state of an upper surface of a roof lining before a wire harness for an automobile roof portion according to an embodiment of the present invention is fixed to a roof lining.
Figure 2:
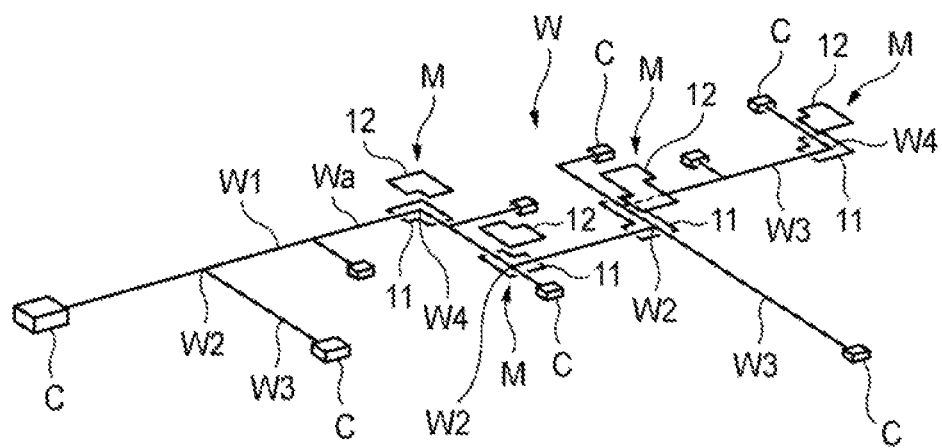
FIG. 2 is a perspective view showing a state in which tapes which sandwich an electric wire are disposed at predetermined positions of the wire harness.
Figure 3:
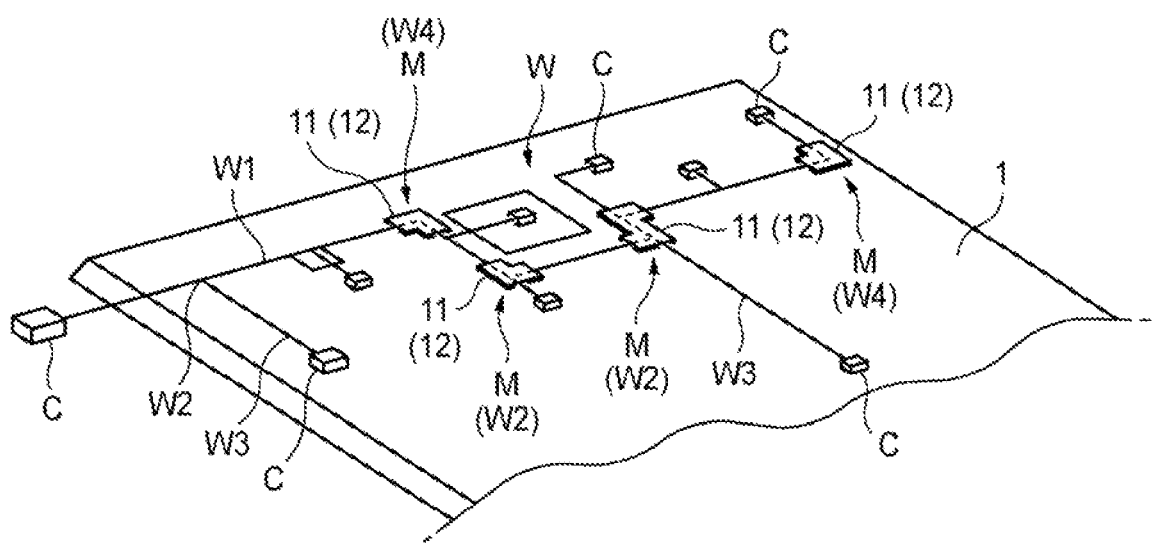
FIG. 3 is a perspective view showing a wiring structure of the wire harness in the automobile roof portion according to the embodiment of the present invention.
Figure 4:
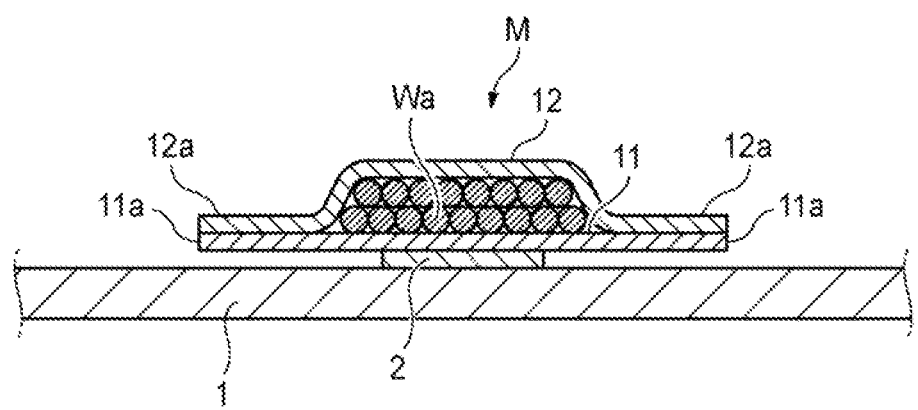
FIG. 4 is an enlarged cross-sectional view of restraint portions by the tapes of FIG. 3.

FIG. 1 is a perspective view showing a state of an upper surface of a roof lining before a wire harness for an automobile roof portion according to an embodiment of the present invention is fixed to a roof lining, FIG. 2 is a perspective view showing a state in which tapes which sandwich an electric wire are disposed at predetermined positions of the wire harness, FIG. 3 is a perspective view showing a wiring structure of the wire harness in the automobile roof portion according to the embodiment of the present invention, and FIG. 4 is an enlarged cross-sectional view of restraint portions by the tapes of FIG. 3.

As shown in FIG. 4, a wire harness W for an automobile roof portion of the present embodiment is fixed to and wired on an adhesive member (double-sided adhesive tape 2) laid on a surface of a roof lining 1 of an automobile. Therefore, as shown in FIG. 1, on the surface of the roof lining 1, the double-sided adhesive tape 2 which is an adhesive member is laid along a predetermined wiring path in advance before wiring of the wire harness W.

As shown in FIGS. 2 and 3, the plurality of electric wires having a connector C attached to terminal portions are wired along a predetermined path, and the wire harness includes a trunk line portion W1 and a branch line portion W3 branched from the trunk line portion W1 via a branch portion W2.

Further, a bend portion W4 whose direction is changed by about 90° is provided in the middle of the trunk line portion W1 and the branch line portion W3, as necessary. Further, in the branch portion W2, there is also a portion where the trunk line portion W1 branches into a plurality of branch line portion W3, or the branch line portion W3 branches into the branch line portion W3 which is further thinner. The definitions of the trunk line portion W1 and the branch line portion W3 are not uniform, and all other than the large trunk line portion W1 may be referred to as branch line portions W3. In any case, a portion including the bend portion W4 and the branch portion W2 on the trunk line portion W1 and the branch line portion W3 and greatly changing the wiring direction of the entire bundle of the electric wires Wa or a part thereof is referred to as a "bent portion" here.

In the wire harness W, of the bent portions (the bend portion W4 and the branch portion W2), a bent portion that serves as a main positioning point in wiring is configured as a restraint portion M that restrains the movement of the electric wire Wa to regulate the direction of the electric wire Wa. In addition, the other portion of the restraint portion M is configured as a non-restraint portion (not particularly denoted by a reference numeral in the drawings) that does not restrain the movement of the electric wire Wa.

In the restraint portion M, the bundle of the electric wires Wa is restrained in a flat shape by sandwiching a plurality of electric wires between the upper and lower two tapes 11, 12. As shown in FIG. 4, as the example of the cross section thereof, the restraint portion M sandwiches the plurality of electric wires Wa between two tapes 11, 12 in which both side edges 11a, 12a in the width direction are fixed to each other. The plurality of electric wires Wa are spread side by side in the width direction of the tapes 11, 12, and are attached to an adhesive surface (reference numeral omitted) provided on the inner surface of at least one of the two tapes 11, 12, so that the restraint portion is a portion in which the bundle of the electric wires Wa is held in a flat shape.

In the illustrated example, an adhesive surface is provided over the entire inner surfaces of the two tapes 11, 12, and among the electric wires Wa disposed side by side in the upper and lower two stages, the electric wire Wa in the lower row is fixed to the adhesive surface of the tape 11 on the lower side, and the electric wire Wa in the upper row is fixed to the adhesive surface of the tape 12 on the upper side. In addition, the adhesive surfaces of both side edges 11a, 12a of the two tapes 11, 12 in the width direction are fixed to each other, whereby the cross section of the restraint portion M is formed into a flat shape.

Here, the restraint portion M is provided at the bent portion (the bend portion W4 or the branch portion W2), and the plurality of electrical wires Wa are restrained by being sandwiched between the two tapes 11, 12 in a state where the direction is regulated in a predetermined direction.

The wire harness W having such a configuration is disposed on the upper surface of the roof lining 1 as shown in FIG. 3, and the outer surface (lower surface) of the tape 11 on the lower side of the restraint portion M is pressed against and attached to the double-sided adhesive tape 2 laid on the surface of the roof lining 1 in advance, whereby the wire harness W is fixed to the surface of the roof lining 1. As a result, the wiring structure of the wire harness of the automobile roof portion shown in FIG. 3 is formed.

According to the wiring structure of the wire harness W of the automobile roof portion and the wire harness W for the automobile roof portion described above, when the wire harness W is wired on the roof lining 1, the wire harness W can be wired with reference to the bent portion (the bend portion W4 or the branch portion W2) set as the restraint portion M. At this time, since the bent portion (the bend portion W4 or the branch portion W2) can easily regulate the direction of the bent electric wires by sandwiching the electric wires Wa between the two tapes 11, 12, it is not necessary to perform orientation of the electric wires Wa which is troublesome when the electric wires are attached, and the wiring performance is improved.

In particular, in a position where the branch portion W2 in which the bundle of the electric wires Wa is divided into a plurality of portions is configured as the restraint portion M, the orientation of the branch line portion W3 extending from the branch portion W2 is accurately performed when the electric wires Wa are sandwiched between the tapes 11, 12 in advance, so that the wire harness W can be easily wired with reference to the position.

In addition, since only the predetermined bent portion (the bend portion W4 or the branch portion W2) serves as the restraint portion M and the other portions serve as the non-restraint portion that does not particularly restrain the electric wires, it is possible to improve the assembling property to the roof lining 1 while utilizing the flexibility of the non-restraint portion. For example, even when some misalignment or the like occurs during wiring, the wiring work can be easily advanced while absorbing and adjusting the misalignment or the like by using the flexibility of the non-restraint portion.

Further, unlike the case where the electric wires Wa are tightly bound by a general tape winding, since the electric wire is merely sandwiched between the tapes 11, 12, the electric wire can be attached to the roof lining 1 with a simple configuration while maintaining the portion (the restraint portion M) of the wire harness W in a flat form.

Specifically, the plurality of electric wires Wa sandwiched between the two tapes 11, 12 are attached to the adhesive surfaces provided on the inner surface of the tapes 11, 12 in a state where the plurality of electric wires are spread side by side. Therefore, the movement of each electric wire Wa can be strongly restrained by the adhesive force of the adhesive surface, the bundle of electric wires Wa in the portion can be reliably maintained in a flat shape, and the wire harness W can be attached to the double-sided adhesive tape 2 of the roof lining 1 with a wide adhesive area while maintaining the flat shape.

Therefore, it is possible to increase the fixing strength while enhancing the wiring workability. In addition, since the electric wire Wa is restrained so as not to move uselessly, the electric wire is less likely to be affected by the vehicle vibration, and only the electric wire Wa is sandwiched between the tapes 11, 12, so that it can be realized with a simple configuration without the need for other binding members.

In the above embodiment, the case where the separate objects are used as the two upper and lower tapes 11, 12 is shown, but one wide tape may be bent at the center in the width direction and used as a tape for combining two tapes.

Further, when the tapes 11, 12 are made transparent or translucent, since the double-sided adhesive tape 2 which is an attachment target part can be seen through, it is possible to attach accurately while visually checking the attachment target part, which can contribute to the improvement of the wiring quality. That is, although it can be seen roughly that the portion is a deformation point (bend portion W4) or an intersection point (branch portion W2) of the electric wires due to the molded portion (restriction portion M) formed by the tapes 11, 12, when the attachment target part is used, the attachment target part can be visually confirmed, so that the alignment can be facilitated and the quality can be improved.

In addition, a colored tape can be adopted for the tapes 11, 12 to perform identification of the individuals, distinction between the left and right, or the like by the color of the tape. In such a case, it is not necessary to separately attach a colored tape for identification.

In addition, since the electric wire Wa is sandwiched between the tapes 11, 12, the protection function for the electric wire Wa can be easily adjusted by increasing or decreasing the thickness of the tapes 11, 12.

In the above embodiment, although the case where the adhesive surface is provided on both inner surfaces of the two tapes 11, 12, the adhesive surface may be provided only on the inner surface of one of the tapes. In this case, it is desirable that all the electric wires Wa arranged in one row are attached to the adhesive surface to maintain the flat shape, but as in the example of FIG. 4, in the case where the electric wires Wa are arranged side by side in two upper and lower stages, a corresponding effect can be expected if only the electric wires Wa in the upper row or the lower row are attached to the adhesive surface.

In addition, the adhesive surface may not be provided on the entire inner surfaces of the tapes 11, 12, and may be provided at least only in the arrangement region of the electric wires Wa in the center in the width direction. The side edge portions of the tapes 11, 12 may be fixed to each other by using an adhesive surface provided on the inner surface, using a separately prepared double-sided adhesive tape, or by any other coupling means. When the adhesive surface or the adhesive is used, if the adhesive surface and the adhesive are not exposed due to misalignment or the like when the tapes 11, 12 are bonded to each other, the bonding workability and the quality is improved.

In addition, if the lengths, widths, colors, or the like of the tapes 11, 12 are different according to the position of the restraint portion M and correspond to the wiring position, the wiring of the wire harness W can be advanced with reference to them.

In addition, the shapes of the tapes 11, 12 may be arbitrarily changed according to the wiring shape of the electric wire Wa restrained by the restraint portion M. When there is an interfering object around the wiring position, it is desirable to cut unnecessary portions of the tapes 11, 12 so as not to interfere with each other during wiring. In addition, the shapes of the tapes 11, 12 may follow the wiring shape of the electric wire Wa inside such that the wiring shape of the electric wire Wa inside can be understood from the outside to some extent.

For example, the restraint portion M may not be provided at a position that is a point for wiring, for example, the restraint portion M may not be provided in the simple T-shaped branch portion W2 where the possibility of erroneous wiring is low.

According to an embodiment, a wiring structure of a wire harness which is a wiring structure of a wire harness of an automobile roof portion in which a wire harness (W) is wired by being fixed to an adhesive member (2) laid on a surface of a roof lining (1) of an automobile, on at least a part of a bent portion (W2, W4) of the wiring path of the wire harness (W) which is wired by bending a plurality of electric wires (Wa), the plurality of electric wires (Wa) are sandwiched between two belt-shaped tapes (11, 12) in which both side edges (11a, 12a) in the width direction are fixed to each other, are spread side by side in the width direction of the tape, and are attached to an adhesive surface provided on an inner surface of at least one of the two tapes (11, 12), thereby providing a restraint portion (M) in which the bundle of the electric wires (Wa) is held in a flat shape, a portion excluding the restraint portion (M) is a non-restraint portion in which the plurality of electric wires (Wa) are unrestrained, and an outer surface of one of the two tapes (11, 12) in the restraint portion (M) is attached to the adhesive member, whereby the wire harness is fixed to the surface of the roof lining (1).

According to the wiring structure of the wire harness having the configuration of the above, when the wire harness is wired on the roof lining, the wire harness can be wired such that the bent portion set as the restraint portion serves as a base position. At this time, since the bent portion can easily regulate the direction of the bent electric wires by sandwiching the electric wires between the two tapes, it is not necessary to perform orientation of the electric wires which is troublesome when the electric wires are attached, and the wiring performance is improved. In addition, since only the predetermined bent portion serves as the restraint portion and the other portion serves as a non-restraint portion that do not particularly restrain the electric wires, it is possible to improve the assembling property to the roof lining while utilizing the flexibility of the non-restraint portion. For example, even when some misalignment or the like occurs during wiring, the wiring work can be easily advanced while absorbing and adjusting the misalignment or the like by using the flexibility of the non-restraint portion. Further, unlike the case where the electric wires are tightly bound by a general tape winding, since the electric wire is merely sandwiched between the tapes, the electric wire can be attached to the roof lining with a simple configuration while maintaining the portion of the wire harness in a flat form.

Specifically, the plurality of electric wires sandwiched between the two tapes are attached to the adhesive surfaces provided on the inner surfaces of the tapes in a state where being spread side by side. Therefore, the movement of each electric wire can be strongly restrained by the adhesive force of the adhesive surfaces, the bundle of electric wires in the portion can be reliably maintained in a flat shape, and the wire harness can be attached to the adhesive member of the roof lining with a wide adhesive area while maintaining the flat shape. Therefore, it is possible to increase the fixing strength while enhancing the wiring workability. In addition, since the electric wire is restrained so as not to move uselessly, the electric wire is less likely to be affected by the vehicle vibration, and only the electric wire is sandwiched between the tapes, so that it can be realized with a simple configuration without the need for other binding members.

In the wiring structure of a wire harness according to the above, a bent portion set as the restraint portion (M) may be a branch portion (W2) that branches the branch line portion (W3) by changing a wiring direction of a part of the electric wires from the trunk line portion (W1) of the wire harness.

According to the wiring structure of the wire harness having the configuration of the above, since the branch portion of the wire harness is provided with the restraint portion that restrains the wire harness in the flat state with the electric wire sandwiched between the two tapes, the wire harness can be easily wired with reference to the position while the orientation of the branch line extending from the branch portion is accurately performed.

According to an embodiment, a wire harness which is a wire harness for an automobile roof portion that is fixed and wired to an adhesive member (2) laid on a surface of a roof lining (1) of an automobile, on at least a part of a bent portion (W2, W4) of the wiring path of the wire harness which is wired by bending a plurality of electric wires (Wa), the plurality of electric wires (Wa) are sandwiched between two belt-shaped tapes (11, 12) in which both side edges (11a, 12a) in the width direction are fixed to each other, are spread side by side in the width direction of the tapes (11, 12), and are attached to an adhesive surface provided on an inner surface of at least one of the two tapes (11, 12), thereby providing a restraint portion (M) in which the bundle of the electric wires (Wa) is held in a flat shape, and a portion excluding the restraint portion (M) is a non-restraint portion in which the plurality of electric wires (Wa) are unrestrained.

According to the wire harness having the configuration of the above, when the wire harness is wired on the roof lining, the wire harness can be wired such that the bent portion set as the restraint portion serves as a base position. At this time, since the bent portion can easily regulate the direction of the bent electric wires by sandwiching the electric wires between the two tapes, it is not necessary to perform orientation of the electric wires which is troublesome when the electric wires are attached, and the wiring performance is improved. In addition, since only the predetermined bent portion serves as the restraint portion and the other portion serves as a non-restraint portion that do not particularly restrain the electric wires, it is possible to improve the assembling property to the roof lining while utilizing the flexibility of the non-restraint portion. For example, even when some misalignment or the like occurs during wiring, the wiring work can be easily advanced while absorbing and adjusting the misalignment or the like by using the flexibility of the non-restraint portion. Further, unlike the case where the electric wires are tightly bound by a general tape winding, since the electric wire is merely sandwiched between the tapes, the electric wire can be attached to the roof lining with a simple configuration while maintaining the portion of the wire harness in a flat form.

Specifically, the plurality of electric wires sandwiched between the two tapes are attached to the adhesive surfaces provided on the inner surface of the tapes in a state where the plurality of electric wires are spread side by side. Therefore, the movement of each electric wire can be strongly restrained by the adhesive force of the adhesive surface, the bundle of electric wires in the portion can be reliably maintained in a flat shape, and the wire harness can be easily attached to the adhesive member of the roof lining with a wide adhesive area while maintaining the flat shape. Therefore, it is possible to increase the fixing strength while enhancing the wiring workability. In addition, since the electric wire is restrained so as not to move uselessly, the electric wire is less likely to be affected by the vehicle vibration, and only the electric wire is sandwiched between the tapes, so that it can be realized with a simple configuration without the need for other binding members.

In the wiring structure according to the above, the bent portion may be a branch portion (W2) that branches the branch line portion (W3) by changing the wiring direction of a part of the electric wires from the trunk line portion (W1) of the wire harness.

According to the wire harness having the configuration of the above, since the branch portion of the wire harness is provided with the restraint portion that restrains the wire harness in the flat state with the electric wire sandwiched between the two tapes, the wire harness can be easily wired to the roof lining with reference to the position while the orientation of the branch line extending from the branch portion is accurately performed.

According to an embodiment, a flat form can be reliably maintain by restraining useless movement of the electric wires, and a strong fixing strength to the roof lining can be stably exhibited.

What is claimed is:

1. A wiring structure of a wire harness which is a wiring structure of a wire harness of an automobile roof portion in which a wire harness is wired by being fixed to an adhesive member laid on a surface of a roof lining of an automobile, wherein on at least a part of a bent portion which is wired by bending a plurality of electric wires of the wiring path of the wire harness, the plurality of electric wires are sandwiched between two belt-shaped tapes in which both side edges in the width direction are fixed to each other, are arranged side by side in the width direction of the tapes, and are attached to an adhesive surface provided on an inner surface of at least one of the two tapes, thereby providing a restraint portion in which the bundle of the electric wires is held in a flat shape, a portion excluding the restraint portion is a non-restraint portion in which the plurality of electric wires are unrestrained, and an outer surface of one of the two tapes in the restraint portion is attached to the adhesive member, whereby the wire harness is fixed to the surface of the roof lining.

2. The wiring structure of a wire harness according to claim 1, wherein a bent portion set as the restraint portion is a branch portion that branches the branch line portion by changing a wiring direction of a part of the electric wires from the trunk line portion of the wire harness.

3. A wire harness which is a wire harness for an automobile roof portion that is fixed and wired to an adhesive member laid on a surface of a roof lining of an automobile, wherein on at least a part of a bent portion which is wired by bending a plurality of electric wires of the wiring path of the wire harness, the plurality of electric wires are sandwiched between two belt-shaped tapes in which both side edges in the width direction are fixed to each other, are arranged side by side in the width direction of the tapes, and are attached to an adhesive surface provided on an inner surface of at least one of the two tapes, thereby providing a restraint portion in which the bundle of the electric wires is held in a flat shape, and a portion excluding the restraint portion is a non-restraint portion in which the plurality of wires are unrestrained.

4. The wiring structure according to claim 3, wherein the bent portion is a branch portion that branches the branch line portion by changing the wiring direction of a part of the electric wires from the trunk line portion of the wire harness.

\* \* \* \* \*